United States Patent [19]
Kennedy

[11] Patent Number: 5,930,156
[45] Date of Patent: *Jul. 27, 1999

[54] EXTENSIBLE MODEL NETWORK REPRESENTATION SYSTEM FOR PROCESS PLANNING

[75] Inventor: Brian M. Kennedy, Coppell, Tex.

[73] Assignee: i2 Technologies, Inc., Irving, Tex.

[ * ] Notice: This patent is subject to a terminal disclaimer.

[21] Appl. No.: 09/057,036

[22] Filed: Apr. 8, 1998

Related U.S. Application Data

[63] Continuation of application No. 08/491,153, Jun. 16, 1995, Pat. No. 5,764,543.

[51] Int. Cl.[6] .................................................. G06F 17/60
[52] U.S. Cl. ................ 364/578; 364/468.05; 364/468.1; 705/8
[58] Field of Search ............................ 364/578, 468.05, 364/468.1; 705/8

[56] References Cited

U.S. PATENT DOCUMENTS

| | | | |
|---|---|---|---|
| 4,209,845 | 6/1980 | Berger et al. .............................. | 364/900 |
| 4,611,280 | 9/1986 | Linderman ................................. | 364/300 |
| 4,611,310 | 9/1986 | Durbin ...................................... | 365/230 |
| 4,827,423 | 5/1989 | Beasley et al. ........................... | 364/468 |
| 5,089,970 | 2/1992 | Lee et al. .................................. | 364/468 |
| 5,130,932 | 7/1992 | Kaihara et al. . | |
| 5,148,370 | 9/1992 | Litt et al. .................................. | 364/468 |
| 5,168,441 | 12/1992 | Onarheim et al. ........................ | 364/146 |
| 5,175,857 | 12/1992 | Inoue ........................................ | 395/800 |
| 5,216,612 | 6/1993 | Cornett et al. ............................ | 364/468 |
| 5,218,700 | 6/1993 | Beechick ................................... | 395/700 |
| 5,229,948 | 7/1993 | Wei et al. ................................. | 364/468 |
| 5,233,533 | 8/1993 | Edstrom et al. .......................... | 364/468 |
| 5,247,693 | 9/1993 | Bristol ...................................... | 395/705 |
| 5,280,425 | 1/1994 | Hogge ....................................... | 364/402 |
| 5,291,394 | 3/1994 | Chapman . | |
| 5,303,144 | 4/1994 | Kawashima et al. ..................... | 364/401 |
| 5,331,545 | 7/1994 | Yajima et al. ............................ | 364/401 |
| 5,369,570 | 11/1994 | Parad ........................................ | 364/401 |
| 5,398,336 | 3/1995 | Tantry et al. ............................. | 707/103 |
| 5,586,039 | 12/1996 | Hirsch et al. ......................... | 364/468.01 |

FOREIGN PATENT DOCUMENTS

| | | |
|---|---|---|
| 0231552 A1 | of 0000 | European Pat. Off. . |
| 0466090 A2 | of 0000 | European Pat. Off. . |
| 0644089 A2 | of 0000 | European Pat. Off. . |

*Primary Examiner*—Kevin J. Teska
*Assistant Examiner*—Hugh Jones
*Attorney, Agent, or Firm*—Baker & Botts, L.L.P.

[57] ABSTRACT

A computer software system for modeling a process capability on a computer is provided. The computer software system comprises an operation model type for defining a plurality of operation models (33, 36, 44, 52 and 57). Each operation model represents an activity that can be performed by a process. A resource model type is for defining a plurality of resource models (32, 38, 40, 46, 48, 54, 56 and 58). Each resource model represents capacity available for use in performing an activity and rules for allocating capacity to the activity. A buffer model type is for defining a plurality of buffer models (34, 42, 50, and 60). Each buffer model represents rules for controlling a flow of material between activities. The operation model type, buffer model type, and resource model type each comprise a plurality of fields defining attributes that include a plurality of extension selector fields. Defined operation models, buffer models, and resource models are stored as nodes in an interrelated process network model.

12 Claims, 2 Drawing Sheets

EXTENSIBLE MODEL NETWORK REPRESENTATION SYSTEM FOR PROCESS PLANNING

RELATED APPLICATIONS

This application is a continuation of application Ser. No. 08/491,153 now U.S. Pat. No. 5,764,543, filed Jun. 16, 1995 by Brian M. Kennedy and entitled "Extensible Model Network Representation System for Process Planning".

CROSS REFERENCE TO RELATED APPLICATIONS

This application is related to the following applications which are incorporated herein by reference:
U.S. application Ser. No. 08/802,434, filed Feb. 18, 1997, and entitled SYSTEM AND METHOD FOR MANAGING ATP.
U.S. application Ser. No. 09/059,223, filed Apr. 13, 1998, and entitled INTERACTIVE REPORT GENERATION SYSTEM AND METHOD OF OPERATION.
U.S. application Ser. No. 08/491,168, filed Jun. 16, 1995, and entitled STRATEGY DRIVEN PLANNING SYSTEM AND METHOD OF OPERATION.

TECHNICAL FIELD OF THE INVENTION

This invention relates in general to the field of process planning. More particularly, the invention relates to an extensible model system architecture for integrated material and capacity planning, and integrated factory and distribution planning.

BACKGROUND OF THE INVENTION

Manufacturers and distributors commit to time critical production and delivery of goods as a regular part of their business. Often, the manufacturing and distribution process is complex, having many different material and capacity constraints that simultaneously affect the implementation of the process. Due to the complexity of the processes, many different software tools have been developed to help manufacturers and distributors plan. Most such tools only address narrow parts of the overall planning process. Several unrelated tools may be required to fully plan a process.

SUMMARY OF THE INVENTION

The present invention provides an extensible model architecture for process planning that eliminates or reduces problems with prior systems.

More particularly, in one embodiment, the present invention provides a computer software system for modeling a process capability on a computer. The computer software system comprises an operation model type for defining a plurality of operation models. Each operation model represents an activity that can be performed by a process. A resource model type is for defining a plurality of resource models. Each resource model represents capacity available for use in performing an activity and rules for allocating capacity to the activity. A buffer model type is for defining a plurality of buffer models. Each buffer model represents rules for controlling a flow of material between activities. The operation model type, buffer model type, and resource model type each comprise a plurality of fields defining attributes. The plurality of fields includes a plurality of extension selector fields that each allow a user to specify one of a plurality of extensions that augment a model with additional fields and semantics. The model type specifies a base set of fields and semantics which includes fields that select extensions that specify additional fields and semantics that can be added to a particular model. The presence of a field in a model is dependent upon a value of another field in the model. Defined operation models, buffer models, and resource models are stored as nodes in an interrelated process network model. The process network model is formed by a plurality of operation models each specifying buffer models from which material is consumed and buffer models to which material is supplied and specifying resource models having capacity used in performing the activity specified by the operation model. In this manner, both material and capacity usage are simultaneously represented along with timing constraints between activities.

According to the present invention, to model a plan for a process, a plan network model is constructed upon the process network model. An operation-plan model type is used to define a plurality of operation-plan models. Each operation-plan model represents a plan for performing an activity represented by an operation model. A resource-plan model type is used to define a plurality of resource-plan models. Each resource-plan model represents a planned usage of capacity represented by a resource model. A buffer-plan model type is used to define a plurality of buffer-plan models. Each buffer-plan model represents a planned flow of material represented by a buffer model. A plan network model is formed by a plurality of operation-plan models each specifying resource-plan models planned to be used in performing the activity specified by the operation-plan. The nodes of the plan network model are built upon and refer to the nodes of the process network model. According to the present invention, the process network model represents possibilities of what can be done, and the plan network model represents that which is planned to be done.

According to one aspect of the present invention, each model type has one or more extension points that may be used to extend the basic model type in order to support the information needed to create the user defined models. For each extension point, a user may select an appropriate extension to model a particular aspect of the user's system.

According to another aspect of the present invention, several elements of a user's process model may share data in a hierarchical fashion referred to as families. A child model inherits all of the data of the parent model unless it is specifically overridden by a designation in the child model. A software system implementing the teachings of the present invention may provide for date effectivity of models using the families feature.

It is a technical advantage of the present invention to use extensions to define the elements of the process or system being modeled because it reduces the amount of data that needs to be stored in a memory device without reducing modeling power. According to the teachings of the present invention, data for each element of the modeled process is stored at a node of a user model or process network model. The data stored at a node comprises only the data for the fields corresponding to the extensions that are selected by the user. The system does not store a zero quantity for each field not chosen by the user. Therefore, the use of extensions reduces the size requirement for a memory device in a system implementing the present invention.

The software system of the present invention can be, but not necessarily, implemented using object oriented programming. Use of object oriented programming supports simultaneous use of multiple types of models for the different elements of the planning problem.

BRIEF DESCRIPTION OF THE DRAWINGS

For a more complete understanding of the present invention and advantages thereof, reference is now made to the following description taken in conjunction with the accompanying drawings in which like reference numbers indicate like features and wherein.

DETAILED DESCRIPTION OF THE INVENTION

Figure 1:
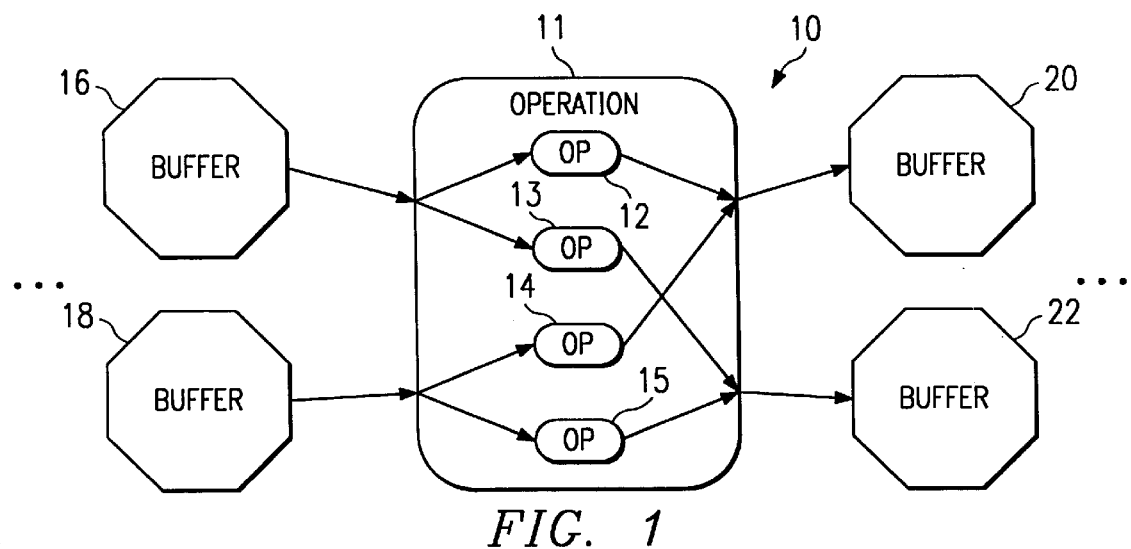
FIG. 1 is a graphical representation of a portion of a process network model implementing an extensible model architecture for use in planning a process according to the teachings of the present invention.

In one embodiment, the present invention provides a software system for modeling various processes. For example, the software system may model a manufacturing process used to produce a particular item or product. The software system may also be used to model a product distribution channel, a supply chain, or an order fulfillment process.

According to the present invention, a process is modeled using three primary model types: an operation model type, a buffer model type, and a resource model type. A plan for that process is similarly modeled with three associated primary model types: the operation-plan, buffer-plan, and resource-plan. A user uses a model type as a template to create a model. For example, a buffer model type is used to create a model of a buffer. Each of these user defined models is stored as a node in a process network model of a user's process.

The model types used by the system are extensible in that each model type may have one or more extension points that allow a user to customize the model to represent the user's process. For each extension point, a user may choose from numerous extensions the one that is best suited to define a particular aspect of the user's system or process. Each model type has a list of predefined extensions from which the user may choose. Each extension defines fields that extend the data and meaning associated with a model type. These extensions and fields define the way in which the model types interact. Each user defined model is defined by a model type, one extension for each extension point of the model type, and data for each field of the model type and extensions. Possible features of each of the model types are discussed in detail below.

The Operation Model Type

The operation model type may be used to create operation models which represent activities that can be performed. As used herein, "operation model type" means a general model for activities that may be modeled by the software. "Operation node" and "operation model" are used interchangeably to represent a specific operation defined by a user using the operation model type. This convention is also used with respect to buffers and resources.

An operation model type models a process, activity, or action that transforms or moves items resulting in a flow into, out of or between buffers. Operations may require resources with specific skills. Those resources model the capacity to perform operations. Buffers model the flow of items that result from operations. Operations model the activity.

Activities may include transportation, storage, picking, receiving, testing, assembling, packaging, manufacturing, designing, setup, maintenance, and other actions. An operation can use any number of resources, with different run times, and with staggered start and end dates. Thus, a single activity or a whole series of activities can be modeled with a single operation. This is important for having sufficient flexibility to model diverse activities in different manufacturers, even within a single supply chain.

The modeling needs of these varied activities can be very different. To support those variations, the operation model can be extended via a 'process' extension. Different extensions each can add different fields to the operation model. A simple process extension may add a single field such as a fixed amount of time that the operation runs. A more complex process extension may add a fixed time and a per-unit time that is computed proportional to the number of units that operation performed. A much more complex process extension may add a field that is a list of other operations which are performed in sequence in order to perform this operation.

Thus, unlike traditional manufacturing software that separate routings and operations, the present invention allows a routing to be modeled as simply a particular kind of operation—an operation that consists of other operations that are run in sequence. The relationships between those sub-operations can be different depending upon the chosen extension. So, an operation can model a simple routing (a sequence of operations allowed to spread), a flow routing (a sequence of operations which must flow into one another), a set of operations that can be run at the same time, alternates (a set of alternate operations), and other combinations.

Further, since routings are modeled as operations, they can be put in other operations. For example, a simple routing operation may consist of five operations. One of those five may be an alternates operation, which consists of three possible operations. One of those possibilities may itself by a simple routing operation consisting of three operations. Thus, depending upon which alternate is chosen, there may be five or seven operations to perform.

An operation can also model simply the bill-of-materials for an item (operations that just model the transform of items, but do not model the capacity required to do that). Similarly, an operation can model simply the bill-of-distribution for an item (operations that just model the movement of items between buffers, but do not model the capacity required to do so). Other operations can then combine the bill-of-materials or bill-of-distribution operations with operations that properly consume capacity. Such separation is common in older manufacturing databases.

Some operation specifications can define multiple operations. For example, some manufacturing software defines operations such that resources can be loaded just during portions of operation time. For ease of interfacing such packages or databases, process extensions can be provided with the identical specification. That process generates a routing-like operation containing auto-generated sub-operations that contain the different phased resource loadings.

An advantage of the operations model type design is simplicity and consistency. By providing a simple building block that is extensible and can be flexibly combined with others, a great deal of modeling capability is provided without complicating the common simple cases. In this way, the critical operations and resources can be modeled in adequate detail while the non-critical models remain suitably inexpensive.

A user may select an extension from the operation model type to, for example, define a transportation operation model. Alternately, a user may choose an extension from the operation model type that creates a smelting operation model for smelting iron ore to produce steel in a smelter. In essence, every act that needs to be performed by a process is modeled using the operation model type.

An example of an extension for an operation model is a run extension. A simple run extension may consist of one field: the fixed amount of time that the operation model is to run. For example, a particular operation that runs for 2 hours may be modeled by that extension. Alternatively, a more complicated run extension may have three fields: such as a load-run-unload. This extension may define a predetermined, constant time for loading material, followed by a run time which is a factor that is multiplied by the quantity of material that is being processed, followed by an unload run time which is constant. The load, run, and unload phases may each require use of different resources.

Operation models represent activities that consume items, produce items, and/or utilize capacity. Such operation models define the activities and precedence (timing) constraints in a process.

In manufacturing, a sequence of operations is referred to as a routing. A routing is represented as an Operation model with a routing extension which defines the behavior of that operation to be a sequence of other operations. Similarly, the specification of alternate resources, alternate operations, and alternate routings can be done with an operation model and an alternates extension which defines the behavior of that operation to be "perform one of these other operations". Additionally, an operation model may maintain constraints between successive operation models such as perish times (i.e. the maximum time between operations).

The Operation-Plan Model Type

An operation-plan model type may be used to create operation-plan models which represent the plans to perform activities that are represented by operation models. The operation-plan model refers to an operation model that defines the allowed behavior. The operation-plan model represents a choice among the allowable behaviors, or even a choice of a disallowed behavior (an infeasible plan). For example, the operation-plan model would include the dates during which the operation will be performed. If different resources may be chosen to perform the activity, the operation model represents those options, whereas the operation-plan model represents a choice of the resource planned to be used.

Extensions selected for the operation model can cause corresponding extensions to be selected for a operation-plan model that refers to the operation model. Those extensions add fields and semantics that correspond with the semantics of the operation model. For example, an extension may add minimum and maximum limits for a value in fields of the operation model, and a corresponding extension may add the planned value as a field of the operation-plan model.

The Resource Model Type

A resource model type may be used to create resource models which represent aspects of a process that have a predetermined capacity. For example, a resource model may represent laborers used in a manufacturing process. A resource model may represent a physical object such as a truck, a forklift, an oven, or any other object used in implementing the process that has a predetermined capacity limitation (such as space, electricity, or money).

The resource model type may provide various extensions from which a user may choose to define an actual capacity constraint on its process. For example, a simple extension may only have a single field setting a maximum capacity constraint. Such a resource model may, for example, represent a truck which has a maximum carrying capacity of 10 tons. Alternatively, a more complex extension may be chosen. For example, the extension may have fields relating to both a maximum capacity and a minimum capacity. Extensions for the resource model type may also have fields for constraints such as the number of set up times allowed in a particular time period or the number of hours that may be devoted to setting up the particular resource.

A resource model may have an efficiency extension that defines in one of a number of different ways how the efficiency of that resource varies over time. The efficiency may be defined as a fixed value, as a value that ramps up over time (a learning curve), or as a value that changes seasonally as specified in a calendar.

A resource model may have a variability extension that defines how the plan should be padded to compensate for the variability of that resource. A resource model may also have a maintenance extension that defines when maintenance is required. One extension may compute based on time since the last maintenance, the load-time during it, a weighted sum of load-times, the number of setups or the setup time, and other such times. It may also determine separately both major and minor maintenance needs.

A resource model may have a size extension that defines the size of the resource and defines how the size is consumed by the various operations. For example, a truck trailer may have a size of up to ten tons and up to twelve feet high, eight feet wide, and 26 feet long. The resource would also know how to compute the weight and the physical dimensions of the operations that use the resource. A resource model may also have a load policy extension that defines the rules for loading that resource (e.g. no overlapping operations, and no operations longer than three hours on Mondays).

Operation models may reserve capacity of predetermined resource models. For example, a user may define a transportation operation model for transporting an item. The transportation operation may reserve a truck resource model to carry out the act of transporting the item.

An operation model may require more than one resource at a time. For example, in a milling process, a particular operation model may specify that it requires a milling machine resource model and a labor resource model. Additionally, an operation may reserve alternate resource models. Finally, a resource model may specify inter-operation constraints such as sequence-dependent set up times or combination constraints. For example, a resource model for an oven may specify that all operations that use the same temperature and are less in size than available space can use a particular oven at the same time.

The resource model type can be used to model and manage a storage space. A storage space may represent, for example, a warehouse, a store room, a refrigerator, or floor space in a factory.

The Resource-Plan Model Type

A resource-plan model type may be used to create resource-plan models which represent the planned availability and usage of the capacity represented by resource models. The resource-plan model refers to a resource model which defines the allowed behavior. The resource-plan model represents a choice among the allowable behaviors, or even a choice of a disallowed behavior (an infeasible plan). For example, the resource-plan model would include the dates during which the resource will run overtime. The resource model represents the options for performing overtime, whereas the operation-plan model represents a choice of the overtime being planned.

Extensions selected for the resource model can cause corresponding extensions to be selected for any resource-plan model that refers to the resource model. Those extensions add fields and semantics that correspond with the semantics of the resource model. For example, an extension may add minimum and maximum limits for a value in fields of the resource model, and a corresponding extension may add the planned value as a field of the resource-plan model.

The Buffer Model Type

The buffer model type is used to create buffer models which manage items consumed and/or produced in the modeled process. In other words, a buffer model represents the management of a particular item. The buffer model type may have extensions that represent constraints such as minimum and maximum inventory levels. Additionally, the buffer model type may have an extension that defines ordering policies such as lot-for-lot, or fixed size batches. A buffer model type extension may also require a "safety stock" that must be on hand at all times in case of emergency.

A buffer model manages the flow of materials to and from an operation model. A buffer model may provide sheet metal to a press for stamping the sheet metal into a particular shape. As part of its definition, an operation model will point to the buffer models that it consumes items from and to the buffer models that it supplies items to. It is noted that a defined buffer model may not have an actual inventory associated with it. Rather, the defined buffer model may simply represent an item flow control point. Alternatively, a buffer model may maintain an inventory of items sitting between operations.

The Buffer-Plan Model Type

A buffer-plan model type may be used to create buffer-plan models which represent the planned availability and usage of the capacity represented by buffer models. The buffer-plan model refers to a buffer model which defines the allowed behavior. The buffer-plan model represents a choice among the allowable behaviors, or even a choice of a disallowed behavior (an infeasible plan). For example, the buffer-plan model would include the dates during which the buffer will run overtime. The buffer model represents the options for performing overtime, whereas the operation-plan model represents a choice of the overtime being planned.

Extensions selected for the buffer model can cause corresponding extensions to be selected for any buffer-plan model that refers to buffer model. Those extensions add fields and semantics that correspond with the semantics of the buffer model. For example, an extension may and minimum and maximum limits for a value in fields of the buffer model, and a corresponding extension may add the planned value as a field of the buffer-plan model.

Process Network Model

FIG. 1 is a graphical representation of a portion of a process network model indicated generally at 10 according to the teachings of the present invention. A process network model is a set of user defined models which may be stored in a computer memory. The stored nodes define, for example, the user's factory which is to be used to manage a particular manufacturing process. A user defines the process network model 10 of FIG. 1 by selecting model types and the appropriate extensions of these model types, as described above, to form models of the elements of the users' process. The nodes in process network model 10 may be connected together in many different ways to achieve different results. Process network model 10 represents all of the possible interconnections between the user defined models. For example, process network model 10 of FIG. 1, in part, consists of four operation models, 11, 12, 13, 14 and 15, and four buffer models, 16, 18, 20 and 22. Material may flow through various paths in process network model 10.

Operation model 11 of FIG. 1 may represent the act of stamping a piece of sheet metal into one of many different predetermined shapes as modeled by operation models 12, 13, 14 and 15. Additionally, buffer models 16 and 18 may supply two different types of sheet metal. The portion of process network model 10 shown in FIG. 1 shows several alternative material flow paths.

For example, sheet metal may be provided by buffer 16 to operation 13 and then to buffer 20. Alternatively, sheet metal may be provided by buffer 16 to operation 14 and then buffer 22. Sheet metal may be provided by buffer 18 to operation 14 and then to buffer 20. Alternatively, sheet metal may be provided by buffer 18 to operation 15 and then buffer 22.

Process network model 10 represents the possible routes that material may flow in a process to be modeled. The software system of the present invention uses the information in a process network model to create plans for implementing a particular material flow path to model a process. The interconnected nodes of the process network model used to represent a particular plan may be referred to as a plan network model or plan.

The software system of the present invention may create a plan network model as a result of several different events. In general, a plan network model provides definitions as to quantities and timing for elements of the model. For example, the inventory level for an item managed by a particular buffer model may drop below an allowable level. In response, the process network model may create a plan network model for replenishing the inventory of that buffer model. Alternatively, a plan may be created using the process network model in response to customer orders.

The software system of the present invention may create a plan network model as follows. For each activity in a user's process, the software system creates an operation plan model from an operation-plan model type using extensions from the corresponding operation model. The system provides the operation plan model with the start and end dates, alternate selections, and other information needed to form a plan for a particular execution of that operation.

For each resource model that is used by an operation plan, the software system creates a resource plan model from a resource-plan model type and the extensions corresponding to the resource model. The system provides the resource plan model with all of the capacity reservations placed on it by the operation plan models.

For each buffer model from which items are consumed or to which items are supplied by an operation plan, the software system creates a buffer plan model from a buffer-plan model type and the extensions of a corresponding buffer model. The system provides the buffer plan model with inventory levels, ordering policies and any other information needed to plan the management of the flow of items in the process. The various plan models interact to create a schedule of events to implement the modeled process to produce a selected quantity of output.

Plan Network Model

Figure 2:
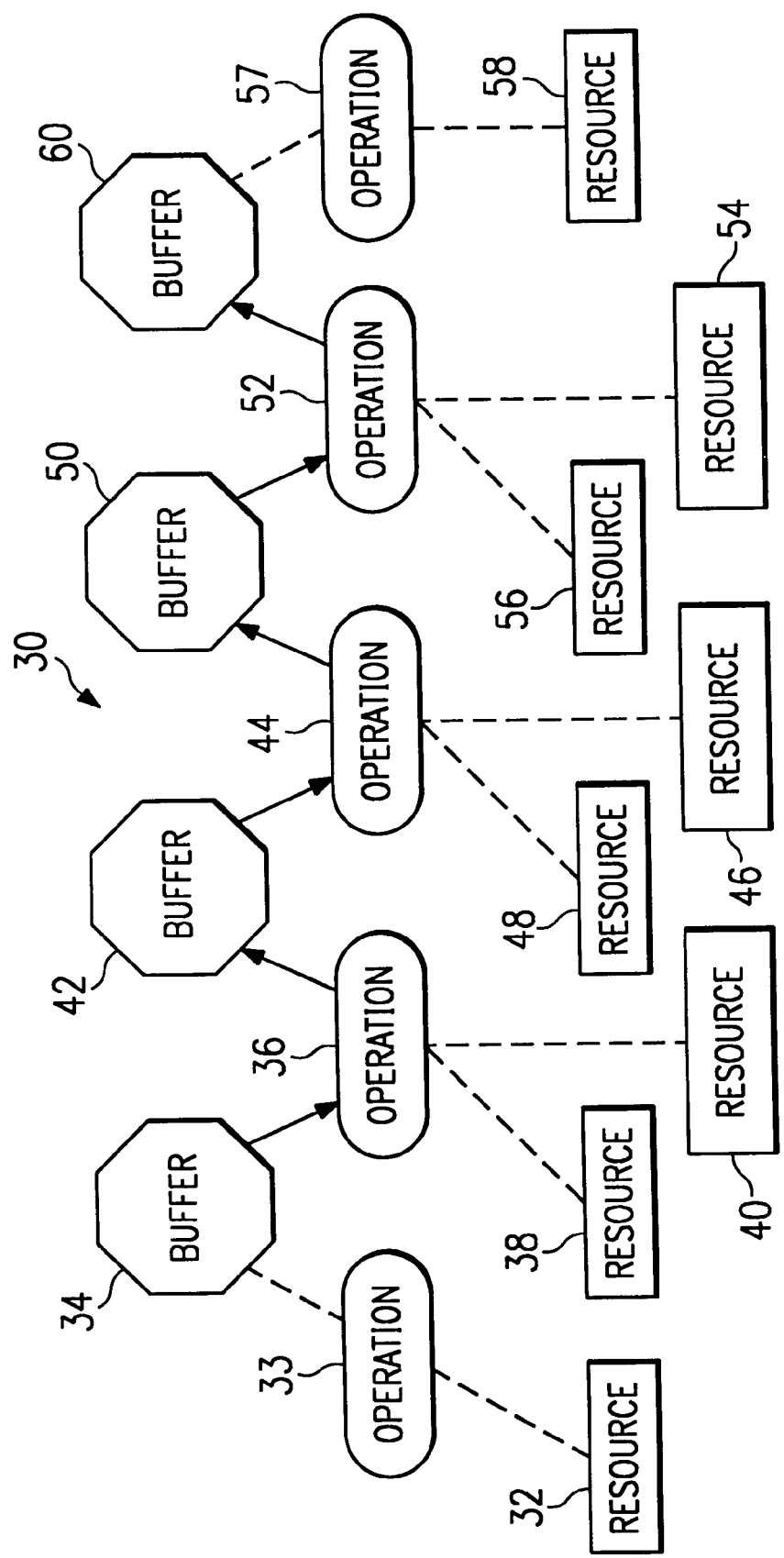
FIG. 2 is a graphical representation of a plan network model implementing an extensible model architecture for use in planning a process according to the teachings of the present invention.

FIG. 2 is a graphical representation of a plan network model for producing, for example, bicycle fenders in a predetermined process. For purposes of FIG. 2, it is assumed that a user has previously defined a site network having all of the operation-plan, buffer-plan, and resource-plan models necessary to model the user's physical facilities and process requirements. In response to a condition for creating a plan as identified above, each operation-plan, buffer-plan, and resource-plan model required for use in the plan creates plan models. The flow of material through the manufacturing process for creating bicycle tires as modeled by the software system of the present invention is described in detail below.

The storage space holding sheet metal for creating bicycle fenders is represented by resource-plan model 32. At operation-plan model 33, sheet metal from resource-plan model 32 is made available in buffer-plan model 34. Buffer-plan model 34 manages the flow of sheet metal. At operation-plan model 36, the sheet metal is stamped into a predetermined shape for the fender. Stamp operation-plan model 36 requires two resource-plan models. First, resource-plan model 38 comprises an industrial press with a die selected to press the sheet metal into a predetermined shape. It is noted that the die may be modeled as a separate resource. A second resource-plan model 40 for operation-plan model 36 may be a laborer that operates press resource-plan model 38.

Buffer-plan model 42 manages the flow of pressed sheet metal from operation-plan model 36 to operation-plan model 44. At operation-plan model 44, the pressed sheet metal is painted. Painting operation-plan model 44 may use resource-plan models 46 and 48 such as a vat of paint and a laborer.

The final step in preparing the fender is to dry the paint. Buffer-plan model 50 manages the flow of material from painting operation-plan model 44 to drying operation-plan model 52. Operation-plan model 52 utilizes a resource-plan model 54 that may comprise an oven or other appropriate heating element to dry the paint. Heating resource-plan model 54 is operated by resource-plan model 56 which may represent a laborer. The dried fenders are pulled from buffer-plan model 60 and stored in a storage space modeled by resource-plan model 58 by operation-plan model 57.

Families

Nodes in the process and plan network models may be interrelated with common elements in a hierarchical order referred to as families. Each node can have only one family. In a family relationship, the children nodes inherit all the extension and field values of their family nodes unless they are specifically overridden by the child. Any changes to fields of a parent model are effective for the child models that do not override those fields.

Figure 3:
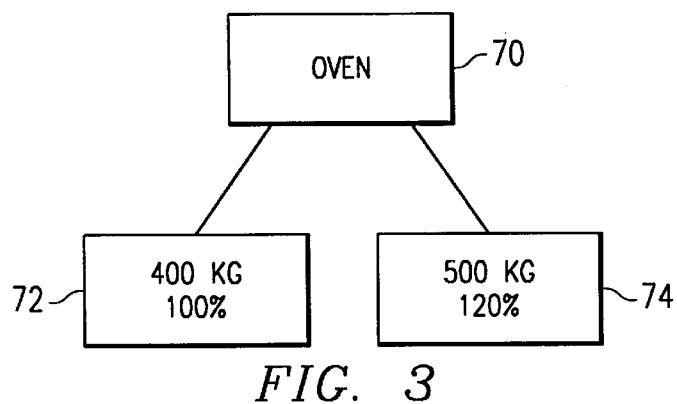
FIG. 3 is a graphical representation of a family of resource models in a process network model implementing inheritance.
Figure 4:
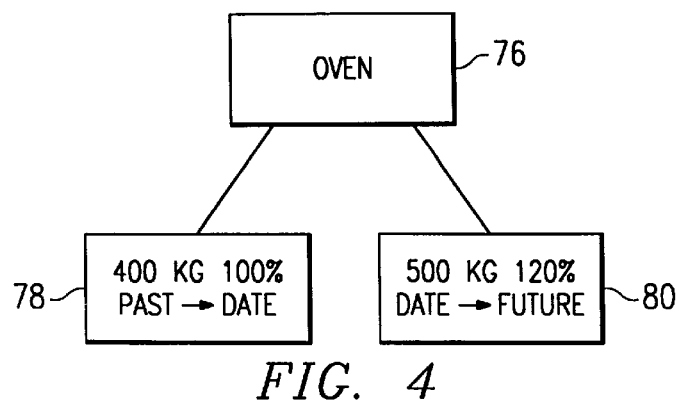
FIG. 4 is a graphical representation of a family of resource models in a process network model implementing date effectivity.

FIG. 3 shows an example of the use of families for a resource model. Resource models 70, 72 and 74 are all ovens. Resource model 70 is the family. Resource models 72 and 74 are the children. Both resource model 72 and resource model 74 have all of the same extensions as resource model 70. Model 72 inherits all values from model 70. Model 74 inherits all values except it has a larger size and higher efficiency.

Use of families allows planning at different levels. In this example, the information stored at the node for resource model 70 may be used to perform aggregate planning. Whereas the information stored at the nodes for resource models 72 and 74 may be used to perform more detailed plans as to what particular ovens are to be used for particular operations.

Date Effectivity

Families may be used to provide an efficient manner in which to update changes to a model. Date effective changes to a model generally affect only a small number of the total fields. It would be tedious and error-prone to have to maintain, for example, many independent copies of the same information in date effective variations. The principle of inheritance in families may be used to efficiently implement date effective changes to a model. As shown in FIG. 3, gas oven resource model 78 is only valid until a specified day, DATE. Beginning on DATE, electric oven resource 80 must be implemented. A date effective field of resource 78 dictates that it may only be used prior to the DATE. After the DATE, only resource model 80 may be used.

Although the present invention has been described in detail, it should be understood that various changes, substitutions and alternations can be made hereto without departing from the spirit and scope of the invention as defined by the appended claims.

What is claimed is:

1. A computer system for modeling a process capability for use in process planning on the computer system, the computer system comprising:

a plurality of operation models defined from an operation model type and stored by the computer system, each operation model representing an activity that can be performed by a process;

a plurality of buffer models defined from a buffer model type and stored by the computer system, each buffer model representing rules for controlling a flow of material between activities, the activities represented operation models;

the operation model type and buffer model type each having a plurality of fields defining attributes; and a process network model, stored by the computer system, interrelating the operation models and the buffer models as nodes;

the process network model formed by the plurality of operation models each specifying buffer models from which material is consumed and buffer models to which material is supplied;

such that material usage is represented by the process network model along with timing constraints between activities.

2. The computer system of claim 1, further comprising:

a plurality of resource models defined from a resource model type and stored by the computer system, each resource model representing capacity available for use in performing an activity and rules for allocating capacity to the activity, the activity represented by an operation model;

the resource model type having a plurality of fields defining attributes;

the process network model further interrelating the the resource models as nodes;

the process network model further formed by the plurality of operation models each specifying resource models having capacity used in performing the activity specified by the operation model;

such that both material and capacity usage are simultaneously represented by the process network model along with timing constraints between activities.

3. The computer system of claim 1, wherein the buffer model type has an operation that defines how material managed by a buffer is stored, and the specified operation model can be extended to specify different scrap factors.

4. The computer system of claim 1, wherein the buffer model type has an operation that defines how material is received into a buffer and how the material is picked from the buffer.

5. The computer system of claim 1, further comprising:

a plurality of resource models defined from a resource model type and stored by the computer system, each resource model representing capacity available for use in performing an activity and rules for allocating capacity to the activity, the activity represented by an operation model;

wherein the buffer model type has an operation that defines how material managed by a buffer is stored, and the specified operation model can be extended to specify different scrap factors and has an operation that defines how material is received into a buffer and how the material is picked from the buffer.

6. The computer system of claim 1, wherein each operation model may specify another operation and each buffer model may specify another buffer as its family and may specify a number of fields as inherited from that family, thereby allowing the fields to be changed in the family by a user, and result in changes to all models that inherit that field.

7. The computer system of claim 6, wherein each operation model and buffer model that specifies a family can also specify a range of dates during which the model is effective such that outside of the range the model is modeled as if the model does not exist.

8. A computer system for executing computer software for modeling a process capability, the computer system comprising:

a data storage device operable to store data relating to a model of process capability;

an execution memory operable to store data representing computer software; and a processor coupled to the data storage device and to the execution memory, the processor operable to execute the computer software, wherein the computer software system comprises;

a plurality of operation models defined from an operation model type, each operation model representing an activity that can be performed by a process; and a plurality of buffer models defined from a buffer model type, each buffer model representing rules for controlling a flow of material between activities;

the operation model type and buffer model type each having a plurality of fields defining attributes; and a process network model interrelating the operation models, the buffer models, and the resource models as nodes;

the process network model formed by a plurality of operation models each specifying buffer models from which material is consumed and buffer models to which material is supplied;

such that material usage is simultaneously represented by the process network model along with timing constraints between activities.

9. The computer system of claim 8, wherein the computer software further comprises;

a plurality of resource models defined from a resource model type, each resource model representing capacity available for use in performing an activity and rules for allocating capacity to the activity;

the resource model type having a plurality of fields defining attributes;

the process network model further formed by the plurality of operation models each specifying resource models having capacity used in performing the activity specified by the operation model;

such that both material and capacity usage are simultaneously represented by the process network model along with timing constraints between activities.

10. A method for modeling a process capability for use in process planning on the computer system, the method comprising:

defining a plurality of operation models from an operation model type, each operation model representing an activity that can be performed by a process;

defining a plurality of buffer models from a buffer model type, each buffer model representing rules for controlling a flow of material between activities, the activities represented operation models; and interrelating the operation models and the buffer models as nodes in a process network model;

the process network model formed by the plurality of operation models each specifying buffer models from which material is consumed and buffer models to which material is supplied;

such that material usage is represented by the process network model along with timing constraints between activities.

11. The method of claim 10, further comprising:

defining a plurality of resource models from a resource model type, each resource model representing capacity available for use in performing an activity and rules for allocating capacity to the activity, the activity represented by an operation model;

interrelating the resource models as nodes in the process network model;

the process network model further formed by the plurality of operation models each specifying resource models having capacity used in performing the activity specified by the operation model;

such that both material and capacity usage are simultaneously represented by the process network model along with timing constraints between activities.

12. The method of claim 10, wherein each plurality of fields includes a plurality of extension selector fields that allow a user to specify one of a plurality of optional extensions incorporating additional fields and semantics in addition to fields specified by the model type into each model selecting the optional extension.

* * * * *

(12) EX PARTE REEXAMINATION CERTIFICATE (8475th)
United States Patent
Kennedy

(10) Number: US 5,930,156 C1
(45) Certificate Issued: Aug. 23, 2011

(54) EXTENSIBLE MODEL NETWORK REPRESENTATION SYSTEM FOR PROCESS PLANNING

(75) Inventor: Brian M. Kennedy, Coppell, TX (US)

(73) Assignee: i2 Technologies US, Inc., Dallas, TX (US)

Reexamination Request:
No. 90/008,645, May 10, 2007

Reexamination Certificate for:
Patent No.: 5,930,156
Issued: Jul. 27, 1999
Appl. No.: 09/057,036
Filed: Apr. 8, 1998

Related U.S. Application Data

(63) Continuation of application No. 08/491,153, filed on Jun. 16, 1995, now Pat. No. 5,764,543.

(51) Int. Cl.
*G06G 7/48* (2006.01)

(52) U.S. Cl. .......................................... 703/6
(58) Field of Classification Search .................. None
See application file for complete search history.

(56) References Cited

U.S. PATENT DOCUMENTS

| | | |
|---|---|---|
| 4,209,845 A | 6/1980 | Berger et al. |
| 4,459,663 A | 7/1984 | Dye |
| 4,591,983 A | 5/1986 | Bennett et al. |
| 4,611,280 A | 9/1986 | Linderman |
| 4,611,310 A | 9/1986 | Durbin |
| 4,796,194 A | 1/1989 | Atherton |
| 4,827,423 A | 5/1989 | Beasley et al. |
| 5,089,970 A | 2/1992 | Lee et al. |
| 5,130,932 A | 7/1992 | Kaihara et al. |
| 5,148,370 A | 9/1992 | Litt et al. |
| 5,168,441 A | 12/1992 | Onarheim et al. |
| 5,175,857 A | 12/1992 | Inoue |
| 5,216,612 A | 6/1993 | Cornett et al. |
| 5,218,700 A | 6/1993 | Beechick |
| 5,229,948 A | 7/1993 | Wei et al. |
| 5,233,533 A | 8/1993 | Edstrom et al. |
| 5,237,497 A | 8/1993 | Sitarski |
| 5,247,693 A | 9/1993 | Bristol |
| 5,255,181 A | 10/1993 | Chapman et al. |
| 5,280,425 A | 1/1994 | Hogge |
| 5,291,394 A | 3/1994 | Chapman |
| 5,295,065 A | 3/1994 | Chapman et al. |
| 5,303,144 A | 4/1994 | Kawashima et al. |
| 5,321,605 A | 6/1994 | Chapman et al. |

(Continued)

FOREIGN PATENT DOCUMENTS

| | | |
|---|---|---|
| EP | 0231552 | 8/1987 |
| EP | 0466089 | 1/1992 |
| EP | 0466090 | 1/1992 |
| WO | WO9117494 | 11/1991 |

OTHER PUBLICATIONS

Harrell, Charles et al., "ProModel Tutorial," Proceedings of the 1993 Winter Simulation Conference, pp. 184–189, ("Harrell").

(Continued)

*Primary Examiner* — Mary Steelman

(57) ABSTRACT

A computer software system for modeling a process capability on a computer is provided. The computer software system comprises an operation model type for defining a plurality of operation models (33, 36, 44, 52 and 57). Each operation model represents an activity that can be performed by a process. A resource model type is for defining a plurality of resource models (32, 38, 40, 46, 48, 54, 56 and 58). Each resource model represents capacity available for use in performing an activity and rules for allocating capacity to the activity. A buffer model type is for defining a plurality of buffer models (34, 42, 50, and 60). Each buffer model represents rules for controlling a flow of material between activities. The operation model type, buffer model type, and resource model type each comprise a plurality of fields defining attributes that include a plurality of extension selector fields. Defined operation models, buffer models, and resource models are stored as nodes in an interrelated process network model.

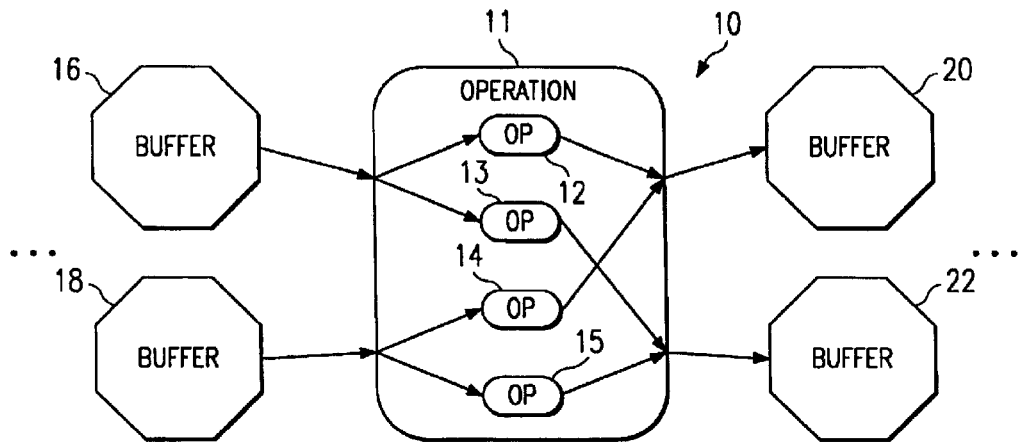

U.S. PATENT DOCUMENTS

| | | |
|---|---|---|
| 5,331,545 A | 7/1994 | Yajima et al. |
| 5,351,196 A | 9/1994 | Sowar et al. |
| 5,369,570 A | 11/1994 | Parad |
| 5,398,336 A | 3/1995 | Tantry et al. |
| 5,586,039 A | 12/1996 | Hirsch et al. |
| 5,594,639 A | 1/1997 | Atsumi |

OTHER PUBLICATIONS

Norman, Van et al., "AutoMod," Proceedings of the 1993 Winter Simulation Conference, pp. 249–254 ("Norman et al.").

Thompson, Michael, "Simulation–Based Capacity Planning and Scheduling With AutoSched," Proceedings of the 1993 Winter Simulation Conference, pp. 255–262 ("Thompson").

Gladwin, Bruce et al., "Modeling Business Processes with Simulation Tools," Proceedings of the 1994 Winter Simulation Conference, pp. 114–121 ("Gladwin").

Goble, John G., "Simobject: From Rapid Prototype to Finished Model," Proceedings of the 1994 Winter Simulation Conference, pp. 437–442 ("Goble 1994").

Roberts, Stephen D., "Simulation Modeling and Analysis With Insight—A Tutorial," Proceedings of the 1982 Winter Simulation Conference, pp. 647–655 ("Roberts 1982").

Pegden, Claude D. et al., "Slam Tutorial," Proceedings of the 1982 Winter Simulation Conference, pp. 661–668 ("Pegden 1982").

Pegden et. al., "Slam Tutorial," Proceedings of the 1981 Winter Simulation Conference, pp. 91–100 ("Pegden 1981").

Mourant, R. R. et al., "'Interactive'—A User Friendly Simulation Language," Proceedings of the 1983 Winter Simulation Conference, pp. 481–494 ("Mourant 1983").

Lilegdon, W. R. et al., "A MicroNET Application," Proceedings of the 1983 Winter Simulation Conference, pp. 497–506 ("Lilegdon 1983").

Adelsberger, H. H., "Interactive Modeling and Simulation of Transaction Flow or Network Models Using the Ada Simulation Support Environment," Proceedings of the 1983 Winter Si.

Roberts, Stephen, "Simulation Modeling with Insight," 1983 Winter Simulation Conference Proceedings, p. 7–16 ("Roberts 1983 II").

Pegden, C. D., "Introduction to SIMAN," 1983 Winter Simulation Conference, pp. 231–241 ("Pegden 1983").

Shoaf, S. A., "A Modular Approach to the Simulation of Manufacturing Processes," Proceedings of the 1983 Winter Simulation Conference, pp. 357–361 ("Shoaf 1983").

Smerilson, Harvey H. et al., "A Production Operations Simulator—Low Yield, High Volume," 1982 Winter Simulation Conference, pp. 233–237 ("Smerilson 1982").

Grant, F. Hank, "Tutorial Scheduling Manufacturing Systems with Factor," Proceedings of the 1989 Winter Conference, pp. 277–280.

Cobbin, Philip, "Simple_1: The Language & Modeling Environment," Proceedings of the 1989 Winter Simulation Conference, 281–290 ("Cobbin").

Beaudoin et al., "Simulation System for the Control of Manufacturing Lines," Proceedings of the 1989 Winter Simulation Conference, pp. 579–583 ("Beaudoin 1989").

Yancey et al., "Implementation of Rule–Based Technology in a Shop Scheduling System," Proceedings of the 1989 Winter Simulation Conference, pp. 865–873 ("Yancey 1989").

Pegden, C. Dennis, "Introduction to SIMAN," Proceedings of the 1985 Winter Simulation Conference, pp. 66–72 ("Pegden 1985").

Rolston, Laurie J. et al., "MAP/1 Tutorial," Proceedings of the 1985 Winter Simulation Conference, pp. 88–93 ("Rolston").

Sinclair, J.B. et al., "Computer Performance Evaluation With GIST: A Tool For Specifying Extended Queueing Network Models," Proceedings of the 1985 Winter Simulation Conferenc.

Suri, Rajan et al., "Manuplan—A Precursor to Simulation for Complex Manufacturing Systems," Proceedings of the 1985 Winter Simulation Conference, pp. 411–420 ("Suri 1985").

O'Reilly, Jean, "Slam II, Including a Material Handling Extension," 1986 Winter Simulation Conference, Proceedings, pp. 89–94, ("O'Reilly 1986").

Pegden, C. Dennis, "Introduction to SIMAN," 1986 Winter Simulation Conference, pp. 95–103 ("Pegden").

Seila, Andrew, "Discrete Event Simulation in Pascal with Simtools," Proceedings of the 1986 Winter Simulation Conference, pp. 141–150 ("Seila 1986").

Gilman, Andrew R. et al., "A Tutorial on See Why and Witness," Proceedings of the 1986 Winter Simulation Conference, pp. 178–183 ("Gilman et al.").

Schriber, Thomas J. "Introduction to GPSS," 1984 Winter Simulation Conference, Proceedings, pp. 13–15.

O'Reilly, Jean J. et. al, "Slam II Tutorial," Proceedings of the 1984 Winter Simulation Conference, pp. 17–19 ("O'Reilly 1984").

Roberts, Stephen D., "Simulation with Insight," 1984 Winter Simulation Conference, Proceedings, pp. 23–32 ("Roberts 1984").

Pegden, C. Dennis, "Introduction to SIMAN," Proceedings of the 1984 Winter Simulation Conference, pp. 35–41 ("Pegden 1984").

O'Reilly, Jean J., "Slam II Tutorial," Proceedings of the 1987 Winter Simulation Conference, pp. 85–92 ("O'Reilly").

Davis, Deborah A. and Pegden, C. Dennis, "Introduction to SIMAN," Proceedings of the 1987 Winter Simulation Conference, pp. 93–101 ("Davis").

Farnsworth, Kenneth D. et al., "Integrated Software for Manufacturing Simulation," Proceedings of the 1987 Winter Simulation Conference, pp. 195–201 ("Farnsworth").

MacFarland, Douglas, "Tutorial Scheduling Manufacturing Systems with Factor," Proceedings of the 1987 Winter Simulation Conference, pp. 235–237.

Tumay, Ken "Factory Simulation with Animation: The No Programming Approach," Proceedings of the 1987 Winter Simulation Conference, pp. 258–260 ("Tumay").

Kilgore, Richard A. et al., "Animation Design With Cinema," Proceedings of the 1987 Winter Simulation Conference, pp. 261–268 ("Kilgore").

Gordon, Robert F. et al., "A Visual Programming Approach to Manufacturing Modeling," Proceedings of the 1987 Winter Simulation Conference, pp. 465–471 ("Gordon").

Pritsker, A. Alan B., "Model Evolution II: An FMS Design Problem," Proceedings of the 1987 Winter Simulation Conference, pp. 567–574 ("Pritsker 1987").

Factor: Schedule Development User's Guide, Version 5.2, Pritsker Corp. (1993).

Diamond, Bob, "Extend: A Library–Based, Hierarchical, Multi–Domain Modeling System," Proceedings of the 1993 Winter Simulation Conference, pp. 240–248 ("Diamond 1993").

Goble, John G., "SimObject: From Rapid Prototype to Finished Model—A Breakthrough in Graphical Model Building," Proceedings of the 1993 Winter Simulation Conference, pp. 23.

William R. Lilegdon, "Manufacturing Decision Making with Factor," Proceedings of the 1993 Winter Simulation Conference, pp. 159–164 ("Lilegdon 1993").

Joines, Jeffrey A. et al., "Building Object–Oriented Simulations with C++," Proceedings of the 1993 Winter Simulation Conference, pp. 79–88 ("Joines 1993").

Lilegdon, William R., "Manufacturing Decision Making with Factor," Proceedings of the 1992 Winter Simulation Conference, pp. 361–365 ("Lilegdon 1992").

Ogle, Michael K. et al., "The Separation and Explicit Declaration of Model Control Structures in Support of Object–Oriented Simulation," Proceedings of the 1991 Winter Simulat.

Baum et al., "An Approach to Modeling Labor and Machine Down Time in Semiconductor Fabrication," Proceedings of the 1991 Winter Simulation Conference, pp. 448–454 ("Baum 1991").

Pritsker et al., "Total Capacity Management Using Simulation," Proceedings of the 1991 Winter Simulation Conference, pp. 348–355 ("Pritsker 1991").

Schewchuck et al., "An Approach to Object–Oriented Discrete–Event Simulation of Manufacturing Systems," Proceedings of the 1991 Winter Simulation Conference, pp. 302–311 (Sch.

Bischak et al., "Object Oriented Simulation," Proceedings of the 1991 Winter Simulation Conference, pp. 194–203 ("Bischak 1991").

Fegan, Joseph et al., "Introduction to Simulation Using Intelligent Simulation Interface (ISI)," Proceedings of the 1991 Winter Simulation Conference, pp. 143–147 (Fegan 1991.

Goble, John, "Introduction to Simfactory II.5,"Proceedings of the 1991 Winter Simulation Conference, pp. 77–80 ("Goble 1991").

Seppanen, M. S., "ALSS II, The Advanced Assembly Line System Simulator," Proceedings of the 1990 Winter Simulation Conference, pp. 625–631 ("Seppanen 1990").

Charles Murgiano, "A Tutorial on Witness," Proceedings of the 1990 Winter Simulation Conference, pp. 177–179 ("Murgiano 1990").

Suri, Rajan et al., "Modeling Manufacturing Systems Using Manuplan and Simstarter—A Tutorial," Proceedings of the 1990 Winter Simulation Conference, pp. 168–176 (Suri 1990.

Harrell, C. R. et al., "ProModel–PC Tutorial," Proceedings of the 1990 Winter Simulation Conference, pp. 128–131 ("Harrell 1990").

Norman, V. B., "AutoMod II," Proceedings of the 1990 Winter Simulation Conference, pp. 94–98 ("Norman 1990").

Roberts, S.D. et al., "Simulation Modeling and Analysis with Insight: A Tutorial," Proceedings of the 1990 Winter Simulation Conference, pp. 80–88 ("Roberts 1990").

SAP Routing Maintenance PP015, R/3 System Release 2.1, (Mar. 1994).

SAP Bills of Material PP010, R/3 System, Release 2.2, (Jul. 1994).

SAP PP—Work Centers, Doc. No. 5000 7630, R/3 system, (Dec. 1993).

SAP PP Routing Guide, Doc. No. 50007629, (Jan. 1994).

SAP Production Orders, Doc. No. 5000 6685, (Jul. 1994).

SAP—PP Routing Guide, Doc. No. 5000 2451, (Jul. 1993).

SAP R/2 RM System Course 140: Production Orders, Rel. 5.0, (May 1, 1992) ("RM 140").

SAP PP Sales and Operations Planning, Document No. 5000 8150, R/3 System, (Feb. 1994).

SAP R/2 RM System Course 120: Routings, (Jan. 1992) ("RM 120").

Abbott, Rebecca A. et al., "Determination of Appropriate Dynamic Slack Sequencing Rules For An Industrial Flow Shop Via Discrete Simulation," Proceedings of the 1982 Winter Si.

Conway, Richard et al., User's Guide to XCELL+ Factory Modeling System, Release 4.0, (3rd ed. 1990) ("XCELL+").

Mourant, Ronald R., "An Interface for Hierarchical Modeling in Object–Oriented Simulation," Computers and Industrial Engineering, vol. 23, Nos. 1–4, pp. 233–235, (1992) (Mour.

Randhawa, Sabah U. et al., "An Object–Oriented Modeling Framework for Sawmill Simulation," Computers and Industrial Engineering, vol. 25, Nos. 1–4, pp. 565–568, (1993) (Randh.

Vollman et al., Manufacturing Planning and Control Systems, Dow Jones–Irwin, (1984) ("Vollman 1984").

Catron, Bryan et al., "ALPS: A Language for Process Specification," Int'l Journal of Computer Integrated Manufacturing, vol. 4. No. 2, pp. 105–133, 1991 ("Catron").

Ray, Steven R., "Using the ALPS Process Plan Model," Proceedings of Manufacturing International 1992, pp. 365–379, ("Ray").

Factor Schedule Management User's Guide, Version 5.2, Pritsker Corp. (1992) ("Factor SSM").

Simobject Reference Manual, CACI Products Co. (1996).

Simobject Programmers Manual, CACI Products Co. (1996).

Factor: Implementation Guide, Version 5.2, Pritsker Corp. (1993).

Factor: Advanced Modeling Reference, Version 5.2, Pritsker Corp. (1993).

Factor Aim Modeling Reference, Version 5.2, Pritsker Corp. (Sep. 1992) ("Factor Aim Modeling Ref.").

Factor Basic Modeling Reference, Version 5.2, Pritsker Corp. (Sep. 1992) ("Factor Basic Modeling Reference").

Interactive Insight Simulation System, SysTech, Inc., Jul. 1989 ("Interactive Insight 1989").

Factor: Reports and Interactive Results Reference, Version 5.2, Pritsker Corp. (1993).

Sharma, Ken, "Adding 'Intelligence' to MRP Systems," APICS—The Performance Advantage, pp. 53–58, Mar. 1993 ("Sharma 1993").

Schriber, Thomas J., Simulation Using GPSS, Wiley (1974).

Factor: Schedule Management User's Guide, Version 5.2, Pritsker Corp. (1993).

SAP R/2 System Summary of Applications, "Silver Brochure," (Jan. 1, 1994) ("Silver Broch. Jan. 1, 1994").

SAP Master Recipe Guide, Doc. No. 5000 8122, (Nov. 1994) ("5000 8122").

SAP Functions in Detail, Production Planning—Process Industry, R/3 System, (Aug. 1994) ("PP–PI").

Roberts, Stephen D. et al., Simulation Modeling with INS, (Dec, 1978) ("Roberts 1978").

SAP PP Capacity Requirements Planning, Doc. No. 5000 7488, (Dec. 1993).

International Search Report for PCT/US/96/09909, Sep. 9, 1996.

i2 Technologies, Inc., "Rhythm Intelligent Planning & Scheduling Systems—Interplant Manual", Jan. 19, 1995, USA.

i2 Technologies, "Rhythm Intelligent Planning & Scheduling Systems—User's Manual", Apr. 6, 1995, Version 2.7, USA.

i2 Technologies, Inc., "Rhythm Intelligent Planning & Scheduling Systems—Reference Manual", Apr. 16, 1995, Version 2.7, USA.

i2 Technologies, Inc., "Rhythm Intelligent Planning & Scheduling Systems—Tutorial Manual (Master Production Planner & Scheduler)" Feb. 24, 1994, Version 2.5.

i2 Technologies, Inc., "Rhythm Intelligent Planning & Scheduling Systems—User's Manual (Master Production Planner & Scheduler)", Feb. 7, 1994, Version 2.5.

i2 Technologies, Inc., "Rhythm Intelligent Planning & Scheduling Systems—Interplant Manual", Mar. 30, 1994, Version 2.5.

i2 Technologies, "Rhythm Intelligent Planning & Scheduling Systems—Tutorial Manual (Master Production Planner & Schedule)", Jan. 26, 1995, Version 2.7.

Stephen D. Roberts, *Simulation Modeling and Analysis with Insight* (1983).

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1, 2, 4 and 8-12 are cancelled.
Claims 3 and 5-7 were not reexamined.

* * * * *